(12) United States Patent
Guo et al.

(10) Patent No.: US 9,629,176 B2
(45) Date of Patent: Apr. 18, 2017

(54) METHOD AND BASE STATION FOR TRANSMITTING UPLINK SCHEDULING INFORMATION

(71) Applicant: SHARP KABUSHIKI KAISHA, Osaka-shi, Osaka (JP)

(72) Inventors: Ziyuan Guo, Shanghai (CN); Renmao Liu, Shanghai (CN); Lei Huang, Shanghai (CN)

(73) Assignee: SHARP KABUSHIKI KAISHA, Osaka (JP)

( * ) Notice: Subject to any disclaimer, the term of this patent is extended or adjusted under 35 U.S.C. 154(b) by 34 days.

(21) Appl. No.: 14/655,629

(22) PCT Filed: Dec. 25, 2013

(86) PCT No.: PCT/CN2013/090438
§ 371 (c)(1),
(2) Date: Jun. 25, 2015

(87) PCT Pub. No.: WO2014/101771
PCT Pub. Date: Mar. 7, 2014

(65) Prior Publication Data
US 2015/0334738 A1 Nov. 19, 2015

(30) Foreign Application Priority Data
Dec. 26, 2012 (CN) .......................... 2012 1 0574807

(51) Int. Cl.
*H04W 72/12* (2009.01)
*H04W 72/00* (2009.01)
*H04J 1/14* (2006.01)

(52) U.S. Cl.
CPC ........... *H04W 72/1284* (2013.01); *H04J 1/14* (2013.01); *H04W 72/005* (2013.01); *H04W 72/1289* (2013.01); *H04W 72/1268* (2013.01)

(58) Field of Classification Search
None
See application file for complete search history.

(56) References Cited

U.S. PATENT DOCUMENTS

2011/0267993 A1* 11/2011 Seo ................. H04B 7/2656
370/279
2011/0268056 A1* 11/2011 Soong ............. H04W 72/0406
370/329
(Continued)

FOREIGN PATENT DOCUMENTS

| CN | 102832989 A | 12/2012 |
|---|---|---|
| WO | WO 2012/103811 A1 | 8/2012 |
| WO | WO 2012/106840 A1 | 8/2012 |

OTHER PUBLICATIONS

Motorola, "Relay HARQ RTT Discussion", 3GPP TSG RAN WG1 Meeting #59bis, R1-100183, Valencia, Spain, Jan. 18-22, 2010.
(Continued)

*Primary Examiner* — Diane Lo
(74) *Attorney, Agent, or Firm* — Birch, Stewart, Kolasch & Birch, LLP

(57) ABSTRACT

The present invention provides a method and a base station each for transmitting uplink scheduling information. The method includes the steps of: for an uplink subframe to be scheduled in accordance with the uplink scheduling information, selecting, from a downlink subframe candidate group, a downlink subframe usable for transmission of the uplink scheduling information, the downlink subframe candidate group including (1) a first downlink subframe corresponding to the uplink subframe in accordance with a predetermined scheduling timing and (2) one or more second downlink subframes each not corresponding to the uplink subframe in accordance with the predetermined
(Continued)

scheduling timing; and transmitting the uplink scheduling information in the selected downlink subframe.

10 Claims, 1 Drawing Sheet

(56) References Cited

U.S. PATENT DOCUMENTS

| | | | |
|---|---|---|---|
| 2013/0121270 A1* | 5/2013 | Chen | H04L 5/001 370/329 |
| 2013/0188516 A1* | 7/2013 | He | H04W 28/16 370/254 |
| 2013/0301420 A1* | 11/2013 | Zhang | H04W 76/048 370/241 |
| 2013/0322378 A1 | 12/2013 | Guan et al. | |
| 2014/0086112 A1* | 3/2014 | Stern-Berkowitz | H04W 72/1289 370/280 |
| 2014/0098721 A1 | 4/2014 | Chen et al. | |

OTHER PUBLICATIONS

Motorola, "Views on Un HARQ Issues for TDD", 3GPP TSG RAN1 #62, R1-104691, Madrid Spain, Aug. 23-27, 2010.
Samsung, "Data scheduling in CA with different TDD UL-DL configurations", 3GPP TSG RAN WG1 Meeting #66, R1-112503, Athens, Greece, Aug. 22-26, 2011.
"Resource Allocation Methods for NCT", R1-125117, 3GPP TSG-RAN WG1 Meeting #71, Qualcomm Incorporated, Nov. 12-16, 2012, New Orleans, USA, pp. 1-2.

* cited by examiner

METHOD AND BASE STATION FOR TRANSMITTING UPLINK SCHEDULING INFORMATION

TECHNICAL FIELD

The present invention relates to mobile communication, specifically to a method and a base station each for transmitting uplink scheduling information.

BACKGROUND ART

According to a long term evolution (LTE) system of 3rd Generation Partnership Project (3GPP), a base station (also referred to as a NodeB or an evolved NodeB (eNB)) transmits uplink scheduling information (e.g., an uplink licensing UL grant) via a physical downlink control channel (PDCCH) or an enhanced physical downlink control channel (ePDCCH). Then, a user equipment (UE) reads the uplink scheduling information in the PDCCH or the ePDCCH and then transmits uplink data in an uplink subframe indicated by that uplink scheduling information. Note that the UE may be a user terminal, a user node, a mobile terminal, or a tablet PC.

3GPP LTE Release 10 defines a scheduling timing indicative of a correspondence relationship between (a) a downlink subframe for transmitting uplink scheduling information and (b) an uplink subframe to be scheduled in accordance with the uplink scheduling information.

A prior art document "R1-125117, 3GPP TSG RAN WG1 Meeting #71, Qualcomm Inc." points out a problem that may occur in LTE Release 12 which will support a new carrier type (NCT). In the NCT, a multimedia broadcast multicast service (MBMS) is supported by a system as it is, and the MBMS inherits standard settings of LTE Release 12 or earlier. According to the standard settings of LTE Release 12 or earlier, time-division multiplexing is employed for (i) an MBMS radio resource and (ii) a PDCCH radio resource in a subframe of a multicast-broadcast single-frequency network (MBSFN).

SUMMARY OF INVENTION

Technical Problem

According to LTE Release 12, the system uses the ePDCCH instead of the PDCCH in a frequency domain in which only an NCT carrier (simply abbreviated to an "NCT") is used. However, in this case, employment of time-division multiplexing makes it impossible for the MBMS radio resource and the ePDCCH radio resource in the subframe of the MBSFN to coexist in a single NCT carrier. Thus, it is necessary to modify a scheduling timing of an uplink resource so that the standard settings of LTE Release 12 or earlier are applied, as they are, to the MBMS in which the NCT in a frequency division duplex (FDD) mode is used.

This requires a new scheduling timing which allows (i) scheduling of a corresponding uplink subframe and (ii) a least influence on current standards even if part of downlink subframes (e.g., a downlink subframe for the MBMS) is unusable for transmission of uplink scheduling information.

Solution to Problem

An object of the present invention is to solve at least part of the problems.

In order to attain the object, the present invention provides, as a first embodiment, a method for transmitting uplink scheduling information, including the steps of: for an uplink subframe to be scheduled in accordance with the uplink scheduling information, selecting, from a downlink subframe candidate group, a downlink subframe usable for transmission of the uplink scheduling information, the downlink subframe candidate group including (1) a first downlink subframe corresponding to the uplink subframe in accordance with a predetermined scheduling timing and (2) one or more second downlink subframes each not corresponding to the uplink subframe in accordance with the predetermined scheduling timing; and transmitting the uplink scheduling information in the selected downlink subframe.

The method in accordance with an embodiment of the present invention is configured such that one downlink subframe usable for transmission of the uplink scheduling information is selected from the one or more second downlink subframes in a case where the first downlink subframe is unusable for transmission of the uplink scheduling information.

The method in accordance with an embodiment of the present invention is configured such that the downlink subframe which is unusable for transmission of the uplink scheduling information is a downlink subframe used as a subframe of a multicast-broadcast single-frequency network (MBSFN).

The method in accordance with an embodiment of the present invention is preferably configured such that the one or more second downlink subframes include at least one downlink subframe which (i) is not used as the subframe of the MBSFN and (ii) is usable for transmission of the uplink scheduling information.

The method in accordance with an embodiment of the present invention is configured such that the predetermined scheduling timing is a frequency division duplex (FDD) scheduling timing defined by Long Term Evolution (LTE) Release 10 of 3rd Generation Partnership Project (3GPP).

The present invention provides, as a second embodiment, a base station for transmitting uplink scheduling information, including: a selection section for selecting, for an uplink subframe to be scheduled in accordance with the uplink scheduling information, from a downlink subframe candidate group, a downlink subframe usable for transmission of the uplink scheduling information, the downlink subframe candidate group including (1) a first downlink subframe corresponding to the uplink subframe in accordance with a predetermined scheduling timing and (2) one or more second downlink subframes each not corresponding to the uplink subframe in accordance with the predetermined scheduling timing; and a transmission section for transmitting the uplink scheduling information in the downlink subframe selected by the selection section.

The base station in accordance with an embodiment of the present invention is configured such that the transmission section selects, from the one or more second downlink subframes, one downlink subframe usable for transmission of the uplink scheduling information in a case where the first downlink subframe is unusable for transmission of the uplink scheduling information.

The base station in accordance with an embodiment of the present invention is configured such that the downlink subframe which is unusable for transmission of the uplink scheduling information is a downlink subframe used as a subframe of a multicast-broadcast single-frequency network (MBSFN).

The base station in accordance with an embodiment of the present invention is preferably configured such that the one or more second downlink subframes include at least one downlink subframe which (i) is not used as the subframe of the MBSFN and (ii) is usable for transmission of the uplink scheduling information.

The base station in accordance with an embodiment of the present invention is configured such that the predetermined scheduling timing is a frequency division duplex (FDD) scheduling timing defined by Long Term Evolution (LTE) Release 10 of 3rd Generation Partnership Project (3GPP).

Advantageous Effects of Invention

The present invention allows (i) scheduling of a corresponding uplink subframe and (ii) a least influence on current standards even if part of downlink subframes (e.g., a downlink subframe for the MBMS) are unusable for transmission of uplink scheduling information.

DESCRIPTION OF EMBODIMENTS

The above features and additional features of the present invention will be made clearer by the detailed description below with reference to the drawings.

A principle and implementation of the present invention will be made clearer by the description below of specific embodiments with reference to the drawings of the present invention. Note that the present invention is not limited to the specific embodiments below. Note also that a detailed description of a publicly-known technique that does not directly relate to the present invention is omitted for convenience of description so that the present invention will not be misunderstood.

The following description specifically discusses embodiments in accordance with the present invention by taking, as an example of an operating environment, an LTE Release 12 mobile communication system and a mobile communication system of an evolved version of LTE Release 12 or later. Note, however, that the present invention is not limited to the embodiments below but is also applicable to other various wireless communication systems such as a future 5G cellular communication system.

In accordance with an FDD mode scheduling timing defined by 3GPP LTE Release 10, uplink scheduling information for scheduling an n+4th uplink subframe is transmitted in an nth downlink subframe. In other words, the nth downlink subframe corresponds to the n+4th uplink subframe. According to an NCT in an FDD mode, the nth downlink subframe which is set for an MBMS, i.e., is used as a subframe of a multicast-broadcast single-frequency network (MBSFN) as described earlier is unusable for transmission of uplink scheduling information. In such a case, the n+4th uplink subframe cannot be scheduled, at the scheduling timing defined by 3GPP LTE Release 10, for transmitting uplink data.

According to the NCT in the FDD mode, one or more downlink subframes of downlink subframes 1, 2, 3, 6, 7, and 8 may each be set as the subframe of the MBSFN. In other words, none of downlink subframes 0, 4, 5, and 9 is used as the subframe of the MBSFN. Thus, according to the new carrier type (NCT) in the FDD mode, one of the downlink subframes 1, 2, 3, 6, 7, and 8 which one is used as the subframe of the MBSFN is unusable for transmission of uplink scheduling information. In such a case, an uplink subframe corresponding to the one of the downlink subframes in accordance with the scheduling timing defined by 3GPP LTE Release 10 cannot be scheduled for transmitting uplink data.

The embodiments of the present invention are described by taking, as an example, the case of the MBMS in which the NCT in the FDD mode is used. Note, however, that a person skilled in the art would understand that a case where a downlink subframe is unusable for transmission of uplink scheduling information is not limited to the case of the MBMS. Further, a scene in which the present invention is employed is not limited to such a scene as described earlier.

Figure 1:
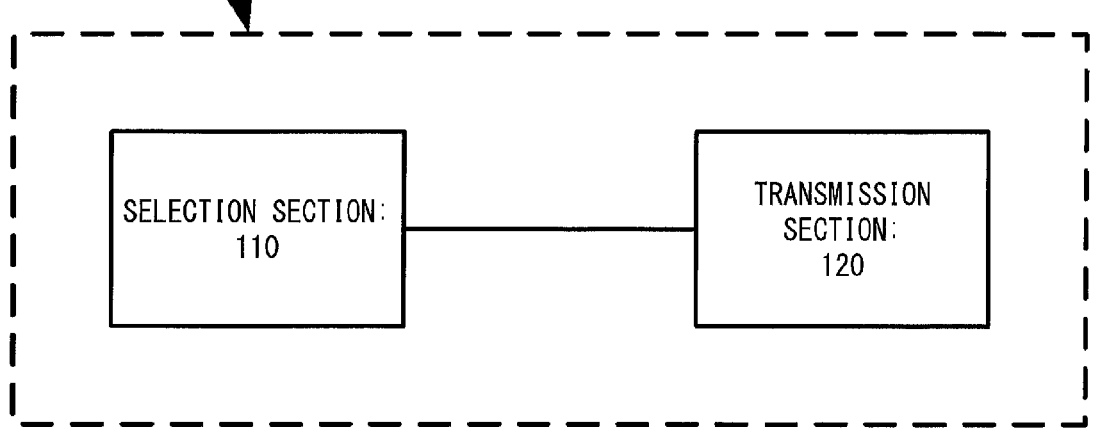
FIG. 1 is a block diagram illustrating a base station in accordance with the present invention.

FIG. 1 is a block diagram illustrating a base station 100 in accordance with the present invention. As illustrated in FIG. 1, the base station 100 includes a selection section 110 and a transmission section 120. Note that a person skilled in the art would understand that the base station 100 also includes other functional sections (e.g., various processors and memories) for carrying out a function thereof.

For an uplink subframe to be scheduled in accordance with uplink scheduling information, the selection section 110 selects, from a downlink subframe candidate group, a downlink subframe usable for transmission of the uplink scheduling information. The downlink subframe candidate group includes: (1) a first downlink subframe corresponding to the uplink subframe in accordance with a predetermined scheduling timing and (2) one or more second downlink subframes each not corresponding to the uplink subframe in accordance with the predetermined scheduling timing.

Note here that the predetermined scheduling timing can be, for example, a frequency division duplex (FDD) scheduling timing defined by 3GPP LTE Release 10, but is not limited to such a scheduling timing.

According to an embodiment of the present invention, the selection section 110 selects one downlink subframe usable for transmission of the uplink scheduling information from the one or more second downlink subframes in a case where the first downlink subframe is unusable for transmission of the uplink scheduling information.

Note here that the downlink subframe which is unusable for transmission of the uplink scheduling information can be a downlink subframe used as a subframe of the multicast-broadcast single-frequency network (MBSFN).

According to an embodiment of the present invention, the one or more second downlink subframes include at least one downlink subframe which (i) is not used as the subframe of the MBSFN and (ii) is usable for transmission of the uplink scheduling information.

The transmission section 120 transmits the uplink scheduling information in the downlink subframe selected by the selection section 110.

The following description discusses operations of sections of the base station 100 with reference to specific examples. Note that a person skilled in the art would understand that the present invention is not limited to the specific examples described below. Note also that the object of the present invention is achieved in a case where the sections of the base station 100 each operate in accordance with the principle of the present invention.

As described earlier, one or more downlink subframes of the downlink subframes 1, 2, 3, 6, 7, and 8 may each be set as the subframe of the MBSFN. In other words, none of the downlink subframes 0, 4, 5, and 9 is used as the subframe of the MBSFN. This makes it always possible to schedule uplink subframes 3, 4, 8, and 9 in accordance with the FDD mode scheduling timing defined by 3GPP LTE Release 10. That is, the downlink subframe 0 can be used to transmit uplink scheduling information for scheduling the uplink subframe 4. The downlink subframe 4 can be used to transmit uplink scheduling information for scheduling the uplink subframe 8. The downlink subframe 5 can be used to transmit uplink scheduling information for scheduling the uplink subframe 9. The downlink subframe 9 can be used to transmit uplink scheduling information for scheduling the uplink subframe 3 of a subsequent radio frame. Meanwhile, since one or more downlink subframes of the downlink subframes 0, 1, 2, 5, 6, and 7 may each be set as the subframe of the MBSFN, it may be impossible to schedule one or more uplink subframes of uplink subframes 0, 1, 2, 5, 6, and 7 at the FDD mode scheduling timing defined by 3GPP LTE Release 10. The following description discusses an operation of such an uplink subframe that may not be scheduled.

According to an embodiment of the present invention, the base station 100 (e.g., the selection section 110) sets a downlink subframe candidate group for each uplink subframe. In the embodiment of the present invention, as a non-limiting example of the downlink subframe candidate group which is set for each uplink subframe, the downlink subframe candidate group which is set for each of the uplink subframes 0, 1, and 2 of a radio frame f can include the downlink subframes 4, 5, 6, 7, and 8 of a radio frame f−1 followed by the radio frame f. According to the FDD mode scheduling timing defined by 3GPP LTE Release 10, the uplink subframes 0, 1, and 2 of the radio frame f correspond to the respective downlink subframes 6, 7, and 8 of the radio frame f−1 followed by the radio frame f. Note that the downlink subframes 4 and 5, neither of which is used as the subframe of the MBSFN as described earlier, can be used to transmit uplink scheduling information. In other words, a downlink subframe candidate group which corresponds to an uplink subframe (e.g., 0, 1, or 2) to be scheduled includes: (1) a first downlink subframe (e.g., 6, 7, or 8) corresponding to the uplink subframe (e.g., 0, 1, or 2) in accordance with the FDD scheduling timing defined by 3GPP LTE Release 10 and (2) one or more second downlink subframes (e.g., 4 or 5) each not corresponding to the uplink subframe (e.g., 0, 1, or 2) in accordance with the FDD scheduling timing defined by 3GPP LTE Release 10.

Further, as a non-limiting example of the downlink subframe candidate group which is set for each uplink subframe, the downlink subframe candidate group which is set for each of the uplink subframes 5, 6, and 7 of the radio frame f can include (i) the downlink subframe 9 of the radio frame f−1 followed by the radio frame f and (ii) the downlink subframes 0, 1, 2, and 3 of the radio frame f. According to the FDD mode scheduling timing defined by 3GPP LTE Release 10, the uplink subframes 5, 6, and 7 of the radio frame f correspond to the respective downlink subframes 1, 2, and 3 of the radio frame f. Note that the downlink subframes 0 and 9, neither of which is used as the subframe of the MBSFN as described earlier, can be used to transmit uplink scheduling information. In other words, a downlink subframe candidate group which corresponds to an uplink subframe (e.g., 5, 6, or 7) to be scheduled includes: (1) a first downlink subframe (e.g., 1, 2, or 3) corresponding to the uplink subframe (e.g., 5, 6, or 7) in accordance with the FDD scheduling timing defined by 3GPP LTE Release 10 and (2) one or more second downlink subframes (e.g., 0 or 9) each not corresponding to the uplink subframe (e.g., 5, 6, or 7) in accordance with the FDD scheduling timing defined by 3GPP LTE Release 10.

For convenience, the following description discusses an embodiment of the present invention by assuming (i) respective timings of scheduling of the uplink subframes 0, 1, and 2, which belong to a first group, and (ii) respective timings of scheduling of the uplink subframes 5, 6, and 7, which belong to a second group. However, as every person skilled in the art knows, the present invention is not limited to such grouping, which is merely taken as an example.

Assume that three uplink subframes in each of the first group and the second group are denoted as respective $i_1$, $i_2$, and $i_3$, and five downlink subframes in a downlink subframe candidate group which corresponds to $i_1$, $i_2$, and $i_3$ are denoted as respective $j_1$, $j_2$, $j_3$, $j_4$, and $j_5$. In a case where ii, $i_2$, and $i_3$ indicate the respective uplink subframes 0, 1, and 2 (the first group) of the radio frame f, $j_1$, $j_2$, $j_3$, $j_4$, and $j_5$ indicate the respective downlink subframes 4, 5, 6, 7, and 8 of the radio frame f−1 followed by the radio frame f in the downlink subframe candidate group which corresponds to the uplink subframe 0, 1, or 2. In a case where $i_1$, $i_2$, and $i_3$ indicate the respective uplink subframes 5, 6, and 7 (the second group) of the radio frame f, $j_1$ indicates the downlink subframe 9 of the radio frame f31 1 followed by the radio frame f, and $j_2$, $j_3$, $j_4$, and $j_5$ indicate the respective downlink subframes 0, 1, 2, and 3 of the radio frame f in the downlink subframe candidate group which corresponds to the uplink subframe 5, 6, or 7.

An MBSFN setting for the downlink subframes is expressed by a binary bit. "0" indicates that a downlink subframe is not used as the subframe of the MBSFN, whereas "1" indicates that a downlink subframe is used as the subframe of the MBSFN. An MBSFN setting for the downlink subframes $j_1$, $j_2$, $j_3$, $j_4$, and $j_5$ is expressed as $j_1 j_2 j_3 j_4 j_5$, which is a 5-bit value. For example, $j_1 j_2 j_3 j_4 j_5 = 00101$ for the first group means that (i) none of the downlink subframes 4, 5, and 7 of the radio frame f−1 followed by the radio frame f is set as the subframe of the MBSFN and (ii) the downlink subframes 6 and 8 of the radio frame f−1 followed by the radio frame f are each set as the subframe of the MBSFN. Further, $j_1 j_2 j_3 j_4 j_5 = 00101$ for the second group means that (i) none of the downlink subframe 9 of the radio frame f−1 followed by the radio frame f and the downlink subframes 0 and 2 of the radio frame f is set as the subframe of the MBSFN and (ii) the downlink subframes 1 and 3 of the radio frame f are each set as the subframe of the MBSFN.

Since none of the downlink subframes 0, 4, 5, and 9 can be the subframe of the MBSFN, $j_1 j_2 = 00$. Meanwhile, $j_3 j_4 j_5$ always has eight different MBSFN settings. Table 1 below specifies a value k of a scheduling timing when $j_1 j_2 j_3 j_4 j_5$ has a given MBSFN setting. The value k indicates a correspondence relationship between a specific uplink subframe m ($i_1$, $i_2$, or $i_3$) and a specific downlink subframe m-k (i.e., the downlink subframe m-k is used to transmit uplink scheduling information for scheduling the uplink subframe m). Note that 3GPP LTE Release 10 defines the FDD scheduling timing where k=4.

TABLE 1

| Value k of MBSFN Scheduling Timing | | | |
|---|---|---|---|
| $j_1 j_2 j_3 j_4 j_5$ | $i_1$ | $i_2$ | $i_3$ |
| 00000 | 4 | 4 | 4 |
| 00001 | 4 | 4 | 5 |

TABLE 1-continued

Value k of MBSFN Scheduling Timing

| $j_1j_2j_3j_4j_5$ | $i_1$ | $i_2$ | $i_3$ |
|---|---|---|---|
| 00010 | 4 | 5 | 4 |
| 00011 | 4 | 6 | 6 |
| 00100 | 5 | 4 | 4 |
| 00101 | 5 | 4 | 5 |
| 00110 | 6 | 6 | 4 |
| 00111 | 6 | 7 | 7 |

A system that supports scheduling across carriers and is capable of carrying out scheduling across carriers in a case where there exist one or more non-NCT carriers (i.e., one or more conventional common carriers) may cause the base station to carry out a process for carrying out scheduling across carriers for one NCT carrier. Meanwhile, the scheduling timing described earlier can be used in a case where (i) the scheduling across carriers is not supported by the system, (ii) there exists no conventional common carrier that is suitable for the system, or (iii) the scheduling across carriers cannot be carried out by a conventional common carrier in the system (e.g., a gap between a frequency of the conventional common carrier and a frequency of the NCT carrier is too wide). In the scheduling across carriers, to which scheduling the frequency division duplex (FDD) scheduling timing defined by the current LTE Release 10 is conventionally applied, uplink scheduling information included in the NCT carrier is transmitted via a downlink control channel (PDCCH/ePDCCH) by another carrier. For example, in a case where a method for carrying out the scheduling across carriers is employed and a downlink subframe m-4 cannot be used to schedule an uplink subframe m of its own carrier, the uplink subframe m is scheduled across carriers by use of the downlink subframe m-4 of another carrier.

The following description discusses specific examples with reference to Table 1. Note that the principle of the present invention is not limited to the specific examples below, which are merely schematic examples.

(Embodiment 1)<Case where None of Downlink Subframes of Radio Frame f-1 Followed by Radio Frame f is Set as Subframe of MBSFN and Downlink Subframes 1, 2, and 8 of Radio Frame f are Each Set as Subframe of MBSFN>

As described earlier, it is always possible to schedule the uplink subframes 3, 4, 8, and 9 of any of the radio frames.

Next, assume that $j_1$, $j_2$, $j_3$, $j_4$, and $j_5$ indicate the respective downlink subframes 4, 5, 6, 7, and 8 of the radio frame f-1 followed by the radio frame f. In this case, $i_1$, $i_2$, and $i_3$ indicate the respective uplink subframes 0, 1, and 2 of the radio frame f. Since none of $j_1$, $j_2$, $j_3$, $j_4$, and $j_5$ of the present embodiment is set as the subframe of the MBSFN, an MBSFN setting is expressed as $j_1j_2j_3j_4j_5$=00000. As shown in Table 1, k, to which the uplink subframes each correspond, =4. That is, uplink scheduling information can be transmitted in accordance with the FDD scheduling timing defined by 3GPP LTE Release 10.

Subsequently, assume that $j_1$ indicates the downlink subframe 9 of the radio frame f-1 followed by the radio frame f, and $j_2$, $j_3$, $j_4$, and $j_5$ indicate the respective downlink subframes 0, 1, 2, and 3 of the radio frame f. In this case, $i_1$, $i_2$, and $i_3$ indicate the respective uplink subframes 5, 6, and 7 of the radio frame f. Further, the MBSFN setting in this case is expressed as $j_1j_2j_3j_4j_5$=00110. As shown in Table 1, it is revealed:

(i) that k, to which the uplink subframe $i_1$ corresponds, =6, i.e., the uplink subframe 5 of the radio frame f corresponds to the downlink subframe 9 of the radio frame f-1 followed by the radio frame f;

(ii) that k, to which the uplink subframe $i_2$ corresponds, =6, i.e., the uplink subframe 6 of the radio frame f corresponds to the downlink subframe 0 of the radio frame f; and (iii) that k, to which the uplink subframe $i_3$ corresponds, =4, i.e., the uplink subframe 7 of the radio frame f corresponds to the downlink subframe 3 of the radio frame f.

Further, assume that $j_1$, $j_2$, $j_3$, $j_4$, and $j_5$ indicate the respective downlink subframes 4, 5, 6, 7, and 8 of the radio frame f. In this case, $i_1$, $i_2$, and $i_3$ indicate the respective uplink subframes 0, 1, and 2 of a radio frame f+1 following the radio frame f. Further, the MBSFN setting in this case is expressed as $j_1j_2j_3j_4j_5$=00001. As shown in Table 1, it is revealed:

(i) that k, to which the uplink subframe $i_1$ corresponds, =4, i.e., the uplink subframe 0 of the radio frame f+1 following the radio frame f corresponds to the downlink subframe 6 of the radio frame f;

(ii) that k, to which the uplink subframe $i_2$ corresponds, =4, i.e., the uplink subframe 1 of the radio frame f+1 following the radio frame f corresponds to the downlink subframe 7 of the radio frame f; and (iii) that k, to which the uplink subframe $i_3$ corresponds, =5, i.e., the uplink subframe 2 of the radio frame f+1 following the radio frame f corresponds to the downlink subframe 7 of the radio frame f.

Note that the base station can assign the uplink subframes 1 and 2 of the radio frame f+1 following the radio frame f to each of identical or different UEs by scheduling the downlink subframe 7 of the radio frame f. The UEs each read uplink scheduling information and then specify, in accordance with an instruction from the uplink scheduling information, whether or not to carry out uplink transmission in each of the uplink subframes 1 and 2 of the radio frame f+1 following the radio frame f.

As described earlier, in a case where the method for carrying out the scheduling across carriers is employed and a downlink subframe m-4 cannot be used to schedule an uplink subframe m of its own carrier, the uplink subframe m is desirably scheduled across carriers by use of the downlink subframe m-4 of another carrier.

(Embodiment 2)<Case Where None Of Downlink Subframes 0, 1, 3, 4, 5, 7, and 9 of any Radio Frame f are Set as Subframe of MBSFN and Downlink Subframes 2, 6, and 8 of any Radio Frame f are Each Set as Subframe of MBSFN>

As described earlier, it is always possible to schedule the uplink subframes 3, 4, 8, and 9 of any of the radio frames.

Next, assume (i) that $j_1$, $j_2$, $j_3$, $j_4$, and $j_5$ indicate the respective downlink subframes 4, 5, 6, 7, and 8 of the radio frame f-1 followed by the radio frame f and (ii) that $i_1$, $i_2$, and $i_3$ indicate the respective uplink subframes 0, 1, and 2 of the radio frame f. Further, the MBSFN setting in this case is expressed as $j_1j_2j_3j_4j_5$=00101. As shown in Table 1, it is revealed:

(i) that k, to which the uplink subframe $i_1$ corresponds, =5, i.e., the uplink subframe 0 of the radio frame corresponds to the downlink subframe 5 of the radio frame f-1 followed by the radio frame f;

(ii) that k, to which the uplink subframe $i_2$ corresponds, =4, i.e., the uplink subframe 1 of the radio frame f corresponds to the downlink subframe 7 of the radio frame f-1 followed by the radio frame f; and (iii) that k, to which the uplink subframe $i_3$ corresponds, =5, i.e., the uplink subframe 2 of the radio frame f corresponds to the downlink subframe 7 of the radio frame f−1 followed by the radio frame f.

Note that the base station can assign the uplink subframes 1 and 2 of the radio frame f to each of identical or different UEs by scheduling the downlink subframe 7 of the radio frame f−1 followed by the radio frame f. The UEs can each read uplink scheduling information and then specify, in accordance with an instruction from the uplink scheduling information, whether or not to carry out uplink transmission in each of the uplink subframes 1 and 2 of the radio frame f.

Subsequently, assume that $j_1$ indicates the downlink subframe 9 of the radio frame f−1 followed by the radio frame f, and $j_2$, $j_3$, $j_4$, and $j_5$ indicate the respective downlink subframes 0, 1, 2, and 3 of the radio frame f. In this case, $i_1$, $i_2$, and $i_3$ indicate the respective uplink subframes 5, 6, and 7 of the radio frame f. Further, the MBSFN setting in this case is expressed as $j_1j_2j_3j_4j_5$=00010. As shown in Table 1, it is revealed:

(i) that k, to which the uplink subframe $i_1$ corresponds, =4, i.e., the uplink subframe 5 of the radio frame f corresponds to the downlink subframe 1 of the radio frame f;

(ii) that k, to which the uplink subframe $i_2$ corresponds, =5, i.e., the uplink subframe 6 of the radio frame f corresponds to the downlink subframe 1 of the radio frame f; and (iii) that k, to which the uplink subframe $i_3$ corresponds, =4, i.e., the uplink subframe 7 of the radio frame f corresponds to the downlink subframe 3 of the radio frame f.

Note that the base station can assign the uplink subframes 5 and 6 of the radio frame f to each of identical or different UEs by scheduling the downlink subframe 1 of the radio frame f. The UEs can each read uplink scheduling information and then specify, in accordance with an instruction from the uplink scheduling information, whether or not to carry out uplink transmission in each of the uplink subframes 5 and 6 of the radio frame f.

According to the present embodiment, in which a single MBSFN setting is employed for all of the radio frames, the value k of the scheduling timing of each of the uplink subframes of the radio frame f+1 is identical to the value k of the scheduling timing of each of the uplink subframes of the radio frame f.

As described earlier, in a case where the method for carrying out the scheduling across carriers is employed and a downlink subframe m−4 cannot be used to schedule an uplink subframe m of its own carrier, the uplink subframe m is desirably scheduled across carriers by use of the downlink subframe m−4 of another carrier.

The following description discusses, with reference to the drawings, a flow chart showing a method of the present invention for transmitting uplink scheduling information. Note that the method of the present invention is described below with reference to a specific embodiment of the base station 100 so as to be more easily understood. Note, however, that the method of the present invention is described with reference to the above specific functional sections of the base station merely so as to be schematically described. The method of the present invention which method is carried out by, for example, a computer program can be carried out assuming that a base station is provided in a form of an aggregate in which a section and a device do not need to be distinguished from each other unlike those illustrated in FIG. 1. Further, all the features described with reference to the embodiment of the base station 100 are applicable to the following embodiment of the method.

Figure 2:
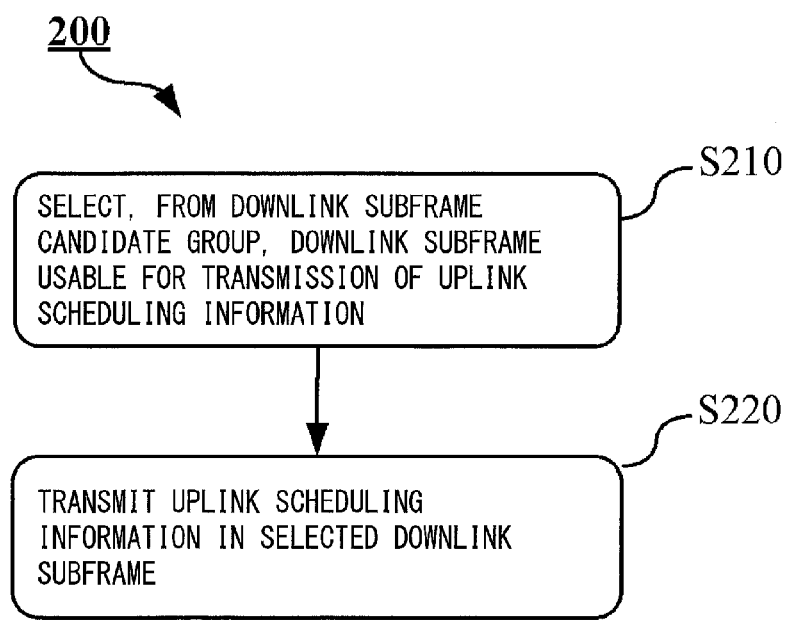
FIG. 2 is a flow chart showing a method in accordance with the present invention for transmitting uplink scheduling information.

FIG. 2 is a flow chart showing a method 200 in accordance with the present invention for transmitting uplink scheduling information. The method 200 is carried out by the base station 100 and includes the steps below.

That is, in a step S210, for an uplink subframe to be scheduled in accordance with the uplink scheduling information, the selection section 110 selects, from a downlink subframe candidate group, a downlink subframe usable for transmission of the uplink scheduling information. The downlink subframe candidate group includes: (1) a first downlink subframe corresponding to the uplink subframe in accordance with a predetermined scheduling timing and (2) one or more second downlink subframes each not corresponding to the uplink subframe in accordance with the predetermined scheduling timing.

In the step S210, the selection section 110 selects, from the one or more second downlink subframes, one downlink subframe usable for transmission of the uplink scheduling information in a case where the first downlink subframe is unusable for transmission of the uplink scheduling information.

Specifically, the downlink subframe which is unusable for transmission of the uplink scheduling information is a downlink subframe used as a subframe of a multicast-broadcast single-frequency network (MBSFN).

The one or more second downlink subframes preferably include at least one downlink subframe which (i) is not used as the subframe of the MBSFN and (ii) is usable for transmission of the uplink scheduling information.

According to the embodiment of the present invention, the predetermined scheduling timing is a frequency division duplex (FDD) scheduling timing defined by Long Term Evolution (LTE) Release 10 of 3rd Generation Partnership Project (3GPP).

In a step S220, the transmission section 120 transmits the uplink scheduling information in the selected downlink subframe.

The present invention allows scheduling of a corresponding uplink subframe even if part of downlink subframes (e.g., downlink subframes for the MBMS) are unusable for transmission of uplink scheduling information. Further, the present invention, in which an FDD scheduling timing defined by current standards is used as much as possible, has a least influence on the current standards.

The above description has discussed the present invention by illustrating favorable embodiments of the present invention. A person skilled in the art would understand that the present invention can be variously improved, replaced, or altered within the spirit and scope of the present invention. Accordingly, the present invention shall be limited by the scope of the claims of the present application and its equivalent without being limited to the embodiments above.

The invention claimed is:

1. A method for transmitting uplink scheduling information in FDD mode, comprising the steps of:

for an uplink subframe to be scheduled in accordance with the uplink scheduling information, selecting, from a downlink subframe candidate group, a downlink subframe usable for transmission of the uplink scheduling information, wherein the downlink subframe candidate group is a group of downlink subframes which is a subgroup of all downlink subframes in a radio frame and includes (1) a first downlink subframe corresponding to the uplink subframe in accordance with a predetermined scheduling timing and (2) one or more second downlink subframes each not corresponding to the uplink subframe in accordance with the predetermined scheduling timing; and transmitting the uplink scheduling information in the selected downlink subframe.

2. The method as set forth in claim 1, wherein one downlink subframe usable for transmission of the uplink scheduling information is selected from the one or more second downlink subframes in a case where the first downlink subframe is unusable for transmission of the uplink scheduling information.

3. The method as set forth in claim 2, wherein the downlink subframe which is unusable for transmission of the uplink scheduling information is a downlink subframe used as a subframe of a multicast-broadcast single-frequency network (MBSFN).

4. The method as set forth in claim 1, wherein the one or more second downlink subframes include at least one downlink subframe which (i) is not used as the subframe of the MBSFN and (ii) is usable for transmission of the uplink scheduling information.

5. The method as set forth in claim 1, wherein the predetermined scheduling timing is a frequency division duplex (FDD) scheduling timing defined by Long Term Evolution (LTE) Release 10 of 3rd Generation Partnership Project (3GPP).

6. A base station for transmitting uplink scheduling information in FDD mode, comprising:

a selection section for selecting, for an uplink subframe to be scheduled in accordance with the uplink scheduling information, from a downlink subframe candidate group, a downlink subframe usable for transmission of the uplink scheduling information, wherein the downlink subframe candidate group is a group of downlink subframes which is a subgroup of all downlink subframes in a radio frames and includes (1) a first downlink subframe corresponding to the uplink subframe in accordance with a predetermined scheduling timing and (2) one or more second downlink subframes each not corresponding to the uplink subframe in accordance with the predetermined scheduling timing; and a transmission section for transmitting the uplink scheduling information in the downlink subframe selected by the selection section.

7. The base station as set forth in claim 6, wherein the transmission section selects, from the one or more second downlink subframes, one downlink subframe usable for transmission of the uplink scheduling information in a case where the first downlink subframe is unusable for transmission of the uplink scheduling information.

8. The base station as set forth in claim 7, wherein the downlink subframe which is unusable for transmission of the uplink scheduling information is a downlink subframe used as a subframe of a multicast-broadcast single-frequency network (MBSFN).

9. The base station as set forth in claim 6, wherein the one or more second downlink subframes include at least one downlink subframe which (i) is not used as the subframe of the MBSFN and (ii) is usable for transmission of the uplink scheduling information.

10. The base station as set forth in claim 6, wherein the predetermined scheduling timing is a frequency division duplex (FDD) scheduling timing defined by Long Term Evolution (LTE) Release 10 of 3rd Generation Partnership Project (3GPP).

* * * * *